W. R. Stephenson,
Saw.
N°67,369.    Patented July 30, 1867.
Fig. 1.    Fig. 2.
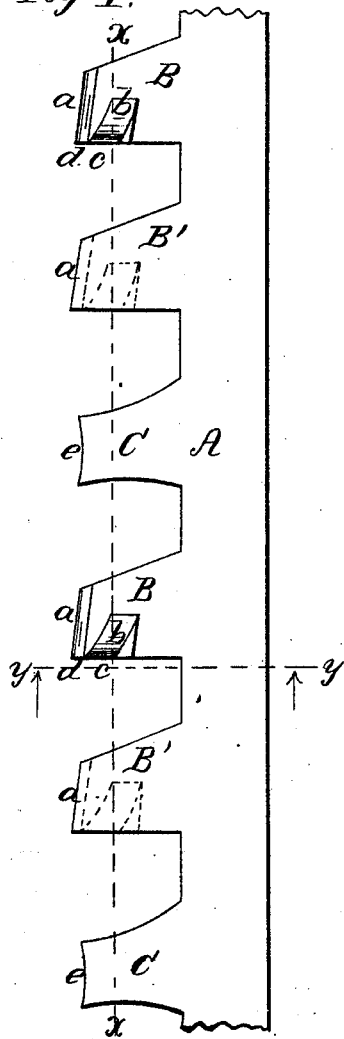 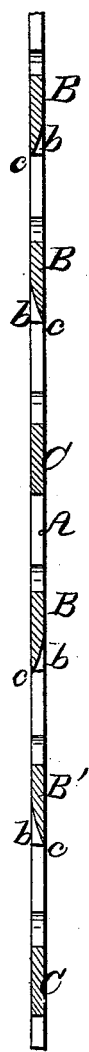
Fig. 3
Witnesses:
Theo Fritsche
Wm Trewin
Inventor,
W R Stephenson
Per Munn & Co
Attorneys

United States Patent Office.

W. R. STEPHENSON, OF TRANSFER STATION, PENNSYLVANIA.

Letters Patent No. 67,369, dated July 30, 1867.

IMPROVEMENT IN SAWS.

*The Schedule referred to in these Letters Patent and making part of the same.*

TO ALL WHOM IT MAY CONCERN:

Be it known that I, W. R. STEPHENSON, of Transfer Station, in the county of Mercer, and State of Pennsylvania, have invented a new and useful Improvement in Saws; and I do hereby declare that the following is a full, clear, and exact description thereof, which will enable others skilled in the art to make and use the same, reference being had to the accompanying drawings, forming part of this specification.

This invention relates to a new and useful improvement in circular and reciprocating saws; and it consists in providing the saws with teeth of peculiar construction, and also with cleaners or scrapers, as hereinafter fully shown and described, whereby a great saving of power is effected in the running of saws, and more work performed in a given time than can be done with the ordinary saws in use. In the accompanying sheet of drawings—

Figure 1 is a side view of a portion of a reciprocating saw constructed according to my invention.

Figure 2, a section of the same, taken in the line $x\ x$, fig. 1.

Figure 3, a transverse section of the same, taken in the line $y\ y$, looking upward.

Similar letters of reference indicate like parts.

A represents a portion of a reciprocating saw, and B B′ C the teeth thereof. The teeth B B′ are placed or arranged in pairs, one directly above the other, and they have broad or long front surfaces $a$, which are slightly oblique or inclined, the lower edges being the most prominent, as shown clearly in fig. 1. These front surfaces $a$ are bevelled in a transverse direction, the bevel of one tooth, B, having a reverse position to that of the other, B′. Each tooth B B′ has a cutting edge given it at bottom by means of an oblique groove, $b$, filed so as to form a feather-edge at $c$, and a cutting lip, $d$, at the bottom of the front edge of said teeth. The groove $b$ in one tooth B is in the side opposite to that in which the groove of the other teeth is made, as shown clearly in fig. 2. The teeth C also have broad front surfaces, and are made slightly concave in a vertical direction, as shown clearly at $e$ in fig. 1. These teeth C are placed between the teeth B′ and B, and are designed to clear the space of dust.

This invention is applicable to either reciprocating or circular saws. It has been practically tested, and has been found to operate well, performing its work with but a moderate expenditure of power, and in a rapid and perfect manner.

Having thus described my invention, I claim as new, and desire to secure by Letters Patent—

The teeth B B′, constructed as described, provided respectively upon opposite sides with the inclined grooves $b$, and having the cutting lips $c\ d$ and inclined bevel surfaces $a$, as herein set forth for the purpose specified.

W. R. STEPHENSON.

Witnesses:
D. B. PACKARD,
B. F. PACKARD.